United States Patent [19]

Burgoyne, Jr et al.

[11] Patent Number: 5,061,298
[45] Date of Patent: Oct. 29, 1991

[54] GAS SEPARATING MEMBRANES FORMED FROM BLENDS OF POLYIMIDE POLYMERS

[75] Inventors: William F. Burgoyne, Jr; Michael Langsam, both of Allentown; Richard H. Bott, Macungie, all of Pa.

[73] Assignee: Air Products and Chemicals, Inc., Allentown, Pa.

[21] Appl. No.: 537,171

[22] Filed: Jun. 13, 1990

[51] Int. Cl.$^5$ ............... B01D 53/22; B01D 71/64
[52] U.S. Cl. ................................. 55/16; 55/68; 55/158
[58] Field of Search ................... 55/16, 68, 158

[56] References Cited

U.S. PATENT DOCUMENTS

| | | | |
|---|---|---|---|
| Re. 30,351 | 7/1980 | Hoehn et al. | 55/16 |
| 3,822,202 | 7/1974 | Hoehn | 55/16 X |
| 4,180,552 | 12/1979 | Graham et al. | 55/16 X |
| 4,378,400 | 3/1983 | Makino et al. | 428/220 |
| 4,528,004 | 7/1985 | Makino et al. | 55/16 X |
| 4,657,564 | 4/1987 | Langsam | 55/16 |
| 4,690,873 | 9/1987 | Makino et al. | 55/16 X |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,746,474 | 5/1988 | Kohn | 55/16 X |
| 4,830,640 | 5/1989 | Nakamura et al. | 55/16 X |
| 4,838,900 | 6/1989 | Hayes | 55/16 |
| 4,880,442 | 11/1989 | Hayes | 55/16 |
| 4,897,092 | 1/1990 | Burgoyne, Jr. et al. | 55/16 |
| 4,929,405 | 5/1990 | Kohn | 55/16 X |
| 4,932,982 | 6/1990 | Hayes | 55/16 |
| 4,932,983 | 6/1990 | Hayes | 55/16 |
| 4,948,400 | 8/1990 | Yamada et al. | 55/16 X |
| 4,952,220 | 8/1990 | Langsam et al. | 55/16 X |
| 4,954,144 | 9/1990 | Burgoyne, Jr. et al. | 55/16 |
| 4,981,497 | 1/1991 | Hayes | 55/16 |

OTHER PUBLICATIONS

Kim et al., "Reverse Permselectivity" of $N_2$ over $CH_4$ in "Aromtic Polyimides", J. Appl. Poly Sci., vol. 34, (1987), p. 1767–1771.

*Primary Examiner*—Robert Spitzer
*Attorney, Agent, or Firm*—Keith D. Gourley; James C. Simmons; William F. Marsh

[57] ABSTRACT

The present invention is a class of semi-permeable polymeric membranes and processes for using such membranes to separate one or more components of a gas mixture. The membranes which are formed from a polymer blend of a first polyimide containing an aromatic diamine and a second polyimide containing an alkenylated diamine having an allyl or allylaryl group exhibit high gas perm-selectivities. The polyimide blends can be surface modified by treatment with an activating force such as high energy electromagnetic irradiation or with a free radical source to impart enhanced selectivity to the membrane without causing a large decrease in composite permeance. These membranes formed from polyimide blends are especially useful in effecting the separation of oxygen and nitrogen from air.

23 Claims, No Drawings

GAS SEPARATING MEMBRANES FORMED FROM BLENDS OF POLYIMIDE POLYMERS

TECHNICAL FIELD OF THE INVENTION

The present invention relates to polymeric membranes formed from blends of at least two polyimides which are useful in gas separation operations.

BACKGROUND OF THE INVENTION

The ever increasing demand for cryogenic gases has led to a search for improved processes for separating the respective components of various gaseous mixtures, including air. Considerable investigation is being conducted in the area of semi-permeable polymeric membranes wherein such membranes exhibit selectivity toward the passage of one or more components of the gaseous mixture through the membrane.

Commercial applications for gas separation devices based on polymeric materials rely, in part, on maximizing the overall gas flux through the membrane. T. H. Kim, et al.. J. Appl. Poly. Sci., 34 1767 (1987), report that membrane gas flux is related to the average space between the polymer chains. In addition, the investigators indicate that the density of the polymer is also related to the overall gas flux.

The success of commercial applications depends upon the identification of polymers having very high flux and good thermo-mechanical properties. High overall flux values are typically exhibited in polymers having low chain-chain interactions as exemplified by polymers such as poly(dimethylsiloxane) and poly(4-methyl-1-pentene). Materials having high gas flux values typically possess low glass transition temperatures (Tg) because of low chain-chain interaction in the polymeric material. As a consequence, these materials typically require special processing conditions to build in chemical and/or physiochemical crosslinking if such materials are to be employed in other than low application temperatures. In contrast, polymers having strong chain-chain interactions typically have rather high Tg values and often exhibit rather low gas flux.

Polyimides, which generally have strong chain-chain interactions and high Tg values, have been reported to exhibit rather high gas flux values when certain structural characteristics are present. Specifically, U.S. Pat. No. 3,822,202 (1974); Re 30,351 (1980) discloses a process for separating fluids using a semi-permeable membrane made from polyimides, polyesters or polyamides. The repeating units of the main polymer chain which have at least one rigid divalent sub-unit, the two main chain single bonds extending therefrom which are not colinear, are sterically unable to rotate 360° around at least one of these bonds, and has 50% or more of its main chain atoms as members of aromatic rings.

U.S. Pat. No. 4,705,540 discloses a highly permeable aromatic polyimide gas separation membrane and processes for using the membrane. The membrane comprises an aromatic polyimide membrane in which the phenylenediamines are rigid and are substituted on essentially all of the positions ortho to the amine substituents and the acid anhydride groups are essentially all attached to rigid aromatic moieties.

U.S. Pat. Nos. 4,717,393 and 4,717,394 teach polymeric membranes and processes for using such membranes for separating components of a gaseous mixture. The membranes disclosed in both of these patents are semi-flexible, aromatic polyimides prepared by polycondensation of dianhydrides with phenylenediamines having alkyl substituents on all positions ortho to the amine functions, or with mixtures of other non-alkylated diamines, some components having substituents on all positions ortho to the amine functions. Membranes formed from this class of polyimides are stated to exhibit improved environmental stability and gas permeability due to optimization of the molecular free volume in the polymer. Such membranes can also be photochemically crosslinked which in some instances results in a better performing semi-permeable membrane.

U.S. Pat. No. 4,378,400 discloses gas separation membranes formed from aromatic polyimides based upon biphenyltetracarboxylic dianhydride for separating various gaseous mixtures.

Attempts have also been made to synthesize membranes having high flux and high selectivity by creating a composite structure on the surface of the polymer by means of a chemical reaction between a labile polymer functionality and some "activating force". Such methods are taught in U.S. Pat. No. 4,657,564 wherein poly(1-trimethylsilylpropyne) is treated with a dilute fluorine gas stream and in U.S. Pat. No. 4,717,393 wherein a polyimide containing a benzophenone-containing linking group is irradiated with a medium pressure mercury lamp.

U.S. patent application Ser. No. 07/420,087, filed 10/11/89, teaches a class of polyimide membranes containing copolymerizable, surface modifiable units containing both aromatic diamines and alkenylated diamines having an allyl or allylaryl group preferably positioned ortho to an amine functionality. The polyimide membranes can be surface-modified by treatment with an activating force such as high energy electomagnetic irradiation or with a free radical source to impart high selectivity to the membrane without causing a large decrease in composite permeance.

A need in the art exists for improved polymeric materials that are highly permeable and which provide selective separation of various gaseous combinations. Such materials would especially be useful in commercial, non-cryogenic gas separation processes.

BRIEF SUMMARY OF THE INVENTION

The present invention relates to a novel class of semi-permeable membranes and processes for using such membranes to separate one or more components of a gaseous mixture. The membranes are formed from a polymer blend comprising a first polyimide polymer containing an aromatic diamine and a second polyimide polymer containing an alkenylated diamine having an allyl or allylaryl group wherein the coexistence of the first and second polyimides provide surface modifiable functionality.

The membrane formed therefrom can be surfaced modified by treatment with a source of high energy electromagnetic irradiation to form a thin film of surface modified polymer at the membrane surface. The thin film of surface modified polymer provides enhanced selectivity for various gas separation applications, especially the separation of oxygen and nitrogen from air, without resulting in a large decrease in the flux of the permeate gas through the membrane.

DETAILED DESCRIPTION OF THE INVENTION

The present invention relates to a novel class of semipermeable membranes and processes for using such membranes to separate one or more components of a gaseous mixture. The membranes are formed from a polymer blend prepared by combining a first polyimide containing an aromatic diamine functionality and a second polyimide polymer containing an alkenylated diamine having an allyl or allylaryl group. The membranes of the present invention are useful in a variety of gas separation applications, especially for the recovery of oxygen from an $O_2/N_2$ stream or from air. The gaseous mixture to be separated is simply brought into contact with the membrane whereby one or more components selectively permeate through the membrane.

In an alternate embodiment, the membranes according to the present invention are surface modified by treatment with an activating force such as high energy electromagnetic irradiation or a free radical source to form a thin film of surface modified polymer at the membrane surface. The thin film of surface modified polymer provides enhanced selectivity for various gas separation applications without resulting in a large decrease in the flux of the permeate gas through the membrane.

While the first and second polyimide polymers are not individually susceptible to surface modification by treatment with an activating source, the coexistence of the first and second polyimides in the form of a polymer blend provides surface modifiable functionality. Upon contacting the polyimide blend with a source of high energy electromagnetic irradiation, a thin film of surface modified polymer is formed at the membrane surface. This phenomenon is hereinafter referred to as surface modification.

The selectivity and permeability of the semi-permeable membranes disclosed herein are unexpected in view of the fact that (1) blends, as opposed to copolymers, of the disclosed polyimides are not known in the art for use in preparing semi-permeable membranes., (2) the individual polyimides, prior to blending, are not responsive to treatment with an activating force such as ultraviolet light and the like; (3) the blending of the two types of polyimides provides surface modifiable functionality which upon contact with a source of high energy electromagnetic irradiation provides a membrane having a thin film of surface modified polymer at the membrane surface and (4) that such surface modified membranes impart high selectivity to the membranes compared to the untreated membrane without causing a large decrease in composite permeance.

The membranes according to the present invention are formed from a polyimide blend comprising from about 10 to 25 weight percent of a first polyimide represented by the formula:

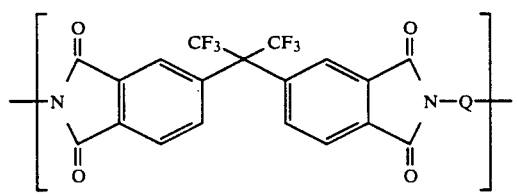

wherein Q is an alkenylated phenylene or diphenylene having the general structural formulae:

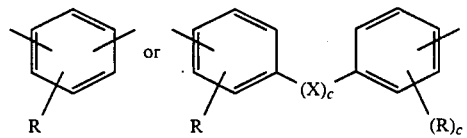

wherein each R is independently an allyl or allylaryl group; X is methylene, alkylene, or $C_1$-$C_6$ branched alkylene group, oxygen, sulfur, sulfonyl, carbonyl or fluoroalkylene and each c is independently 0 or 1; and from 75 to 90 weight percent of a second polyimide represented by the formula:

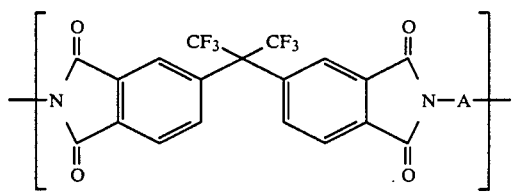

wherein N—A—N is any aromatic diamine which is capable of forming a polyimide.

More specifically, when R is an allyl group it can be represented by the general structural formula:

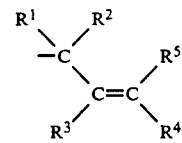

wherein $R^1$, $R^2$, $R^3$, $R^4$ and $R^5$ are hydrogen, $C_{1-3}$ aliphatic, phenyl, halogen or alkoxy radicals, or $R^2$ and $R^4$ or $R^5$ are bridged via an alkylene radical —$(CH_2)_y$— wherein y=2 to 5.

In embodiments in which R is an allylaryl group, it can be represented by the general structural formula:

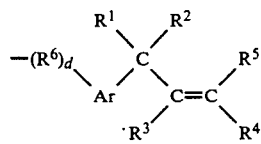

wherein $R^6$ is —$CH_2$—, Ar is phenylene or substituted phenylene, d=0 or 1 and $R^1$, $R^2$, $R^3$, $R^4$ and $R^5$ are as described above.

The moiety represented by Q is incorporated into the first polyimide polymer, disclosed above, by reacting; i.e. adding the corresponding diamine (N—Q—N) to a dianhydride.

As previously stated, while the first and second polyimides disclosed above will not independently respond to treatment by electomagnetic radiation or free radical sources, unexpectedly, we have found that the blending of from 10 to 25 weight percent of a polyimide containing the Q moieties disclosed above with a polyimide containing an aromatic diamine will respond to surface modification reactions. The presence of the unsaturated hydrocarbon radical; i.e., the allyl or allylaryl group is believed to allow for chemical or radiation surface modification. Consequently various other substituents may be present on the phenylene or diphenylene structure as long as one substituent is an R group as described above.

Surface modification is carried out by exposing the dry membrane or the polymer blend, prior to forming the membrane, to any suitable activating force such as high energy electromagnetic irradiation. Examples of such electromagnetic irradiation include longwave and shortwave UV irradiation and x-ray irradiation with or without photo sensitizers. Alternatively, the activating force may be a free radical source which is contacted with the surface of the polymer, such free radical sources including volatile peresters, peroxides and azo compounds followed by thermal activation with or without metal accelerators.

The surface modification processes create a composite polymer film wherein the bulk of the material, having a combination of high flux and low selectivity, provides mechanical support for an in-situ modified surface layer which imparts high selectivity without causing a drastic reduction in the composite permeance. The thickness of the thin film of surface modified polymer formed at the polymer surface will depend upon the intensity and duration of the high energy electromagnetic radiation source, the concentration of the free radical source and the like.

In an alternate embodiment, the first and second polyimides, disclosed above, may be copolymerized with other polyimide structures prior to blending. For example, a first polyimide containing an aromatic diamine functionality may be blended with a copolymer prepared by reacting a second polyimide containing an alkenylated diamine having an allyl or allylaryl group and a third polyimide. Preferred polyimide structural units which may be copolymerized with the first and second polyimides disclosed above are generally represented by the formula:

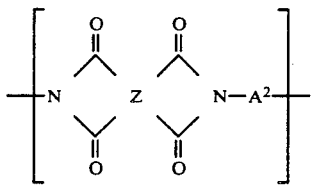

where $A^2$ is any aromatic diamine and

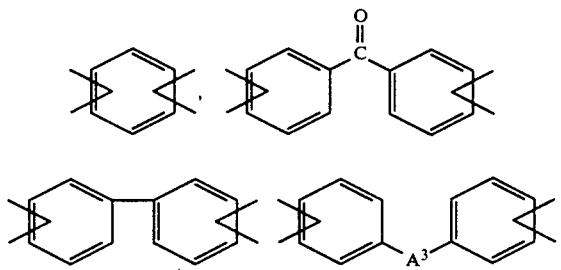

wherein $A^3$ is $C(CH_3)_2$, O, S or $SO_2$.

In addition to these alternate polyimide structures, minor amounts of other monomers may be present which do not affect the gas separation properties of the resultant membrane.

The alkylation chemistry developed by Air Products and Chemicals, Inc. as described in U.S. Pat. No. 4,714,778 and EPO publication No. 277596 can be used to prepare a wide variety of aromatic diamines where an unsaturated hydrocarbon radical is positioned ortho to an amine function. A number of preferred materials which can be made by these methods and subsequently incorporated into a polyimide structure include:

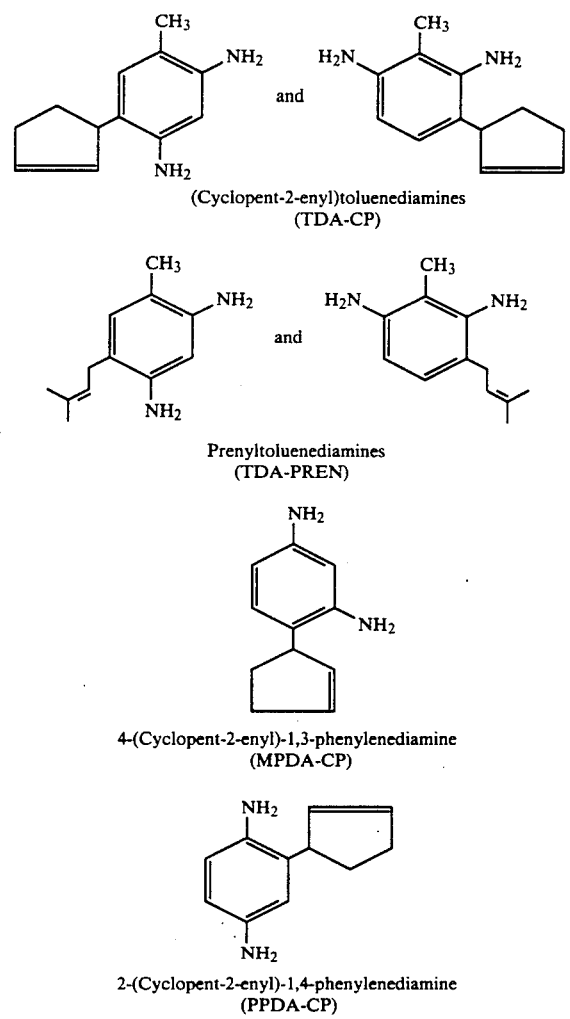

The resultant polyimide blend is subsequently processed into a membrane by methods well known in the art including flat sheets, hollow fibers and the like. Surface modification, as described above, may be carried out on the polymer blend prior to or after it is cast into a membrane, although it is preferred to surface modify in the final form of dried polymer membrane.

The polyimide membranes of the present invention are useful in gas separation applications, especially for the recovery of oxygen from an $O_2/N_2$ stream or from air. The gaseous mixture to be separated is simply brought into contact with the membrane whereby one or more components is selectively permeated through the membrane. The surface modified membranes exhibit enhanced selectivity without causing a large decrease in composite permeance.

The following examples are presented to better illustrate the present invention and are not meant to be limiting.

EXAMPLES 1-4

Preparation of Polyimides by Condensing 6F-Dianhydride with Aromatic Diamines

General Procedure:

The following procedures were used to prepare polyimides by condensing 5,5'-[2,2,2-trifluoro-1-(trifluoromethyl)ethylidine]bis-1,3-isobenzofuranedione (6F-dianhydride)with the aromatic diamine mixtures indicated in Table 1. Variations in polymerization reaction parameters between the different phenylenediamines reflect the specific conditions required to obtain good, film-forming polyimides.

Polyamic Acid Preparation: A 20.00 g (0.04502 mol) portion of 6F-dianhydride was added proportionately through the course of 0.5 hr. to a solution of 0.04502 mols of the aromatic diamine mixture in anhydrous N,N-dimethyl acetamide (DMAC). During the addition, the mixture was stirred mechanically under an inert nitrogen blanket. The initial reaction temperature for a given aromatic diamine mixture is indicated in Table 1. The amount of DMAC used was determined by the percent solids concentration also indicated in Table 1. Approximately one hour after the addition of dianhydride, the reaction temperature was brought to 25° C. and the reaction mixture was stirred for the indicated reaction time. This polyamic acid solution was used directly in preparing the corresponding polyimide solution.

Polyimide Preparation: The solids concentration of the polyamic acid solution was adjusted with DMAC values indicated in Table 1. Acetic anhydride (9.18g, 0.0900 mol) and 2.27g (0.0225 mol) of triethylamine were added to the polyamic acid solution and the solution was heated to 60° C. for 3 hours with stirring. After cooling, the polyimide solution was cast on glass plates, and ca. 100 micron thick, polyimide films were obtained after vacuum drying at 70° C./150 mm Hg for 16 hours, 100.C/0.20 mm Hg for 16 hours followed by 240° C./0.200 mm Hg. The polyimide films obtained following the drying procedure were determined to contain less than 0.5 weight percent DMAC as determined by thermal gravimetric analysis.

Examples 1-4 were prepared according to the above-mentioned procedure. The Tg and inherent viscosity of the various polyimide homopolymers are presented in Table 1.

TABLE 1
Preparation of Polyimide Homopolymers

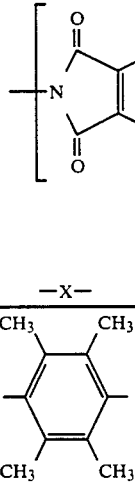

| Example | —X— | Initial Reaction Temp (°C.) | % Solids Polyamic Acid Solution | % Solids Imidization | Polyimide Film Tg (°C.) | Polyimide Film IV |
|---|---|---|---|---|---|---|
| 1 | 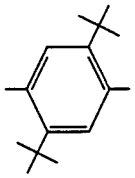 | 25 | 25 | 15 | >350 | 1.0 |
| 2 | 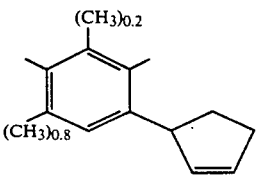 | 25 | 40 | 25 | >400 | .598 |
| 3 | (CH₃)₀.₂ / (CH₃)₀.₈ (cyclopentenyl) | 25 | 25 | 15 | >400 | .651 |
| 4 | 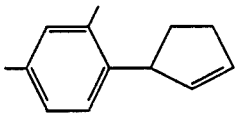 | 25 | 25 | 15 | >400 | .328 |

EXAMPLE 5

Irradiation of Homopolyimides

Dense films of the individual homopolymers according to Examples 1–4, respectively, were irradiated for 30 minutes using a Hanovia 450 watt medium pressure UV lamp (Ace Glasswear Catalog #7825-34). The UV treated membranes, along with the untreated (control) membranes were tested for oxygen permeance and $O_2/N_2$ selectivity. The results of these tests are set out in Table 2. Runs 1 through 8 demonstrate that membranes prepared from the homopolymers according to Examples 1 through 4 are not responsive to UV treatment.

TABLE 2
Irradiation of Various Polyimide Homopolymers

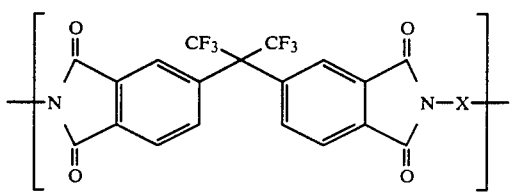

| Run | Example | UV Time (min.) | $\overline{P}(O_2)$ | $\alpha(O_2/N_2)$ |
| --- | --- | --- | --- | --- |
| 1 | 1 | 0 | 165 | 3.21 |
| 2 | 1 | 30 | 182 | 3.34 |
| 3 | 2 | 0 | 177 | 3.85 |
| 4 | 2 | 30 | 157 | 3.91 |
| 5 | 3 | 0 | 9.1 | 4.40 |
| 6 | 3 | 30 | 10.5 | 4.64 |
| 7 | 4 | 0 | 5.17 | 4.87 |
| 8 | 4 | 30 | 4.48 | 5.08 |

EXAMPLE 6

Irradiation of Polyimide Blends

A series of membranes prepared from a blend of 90 weight percent DDA polyimide (Example 1) and 10 weight percent TDA-CP polyimide (Example 3) were prepared. The resultant membranes were treated with U.V. irradiation for varying lengths of time. The treated membranes, along with a control (untreated) membrane, were tested for oxygen and nitrogen permeability and selectivity. U.V. treatment times and the results are set out in Table 3. The measured values for oxygen and nitrogen permeability were used to calculate the composite P/l values using the series resistance model. Runs 9 through 13 demonstrate that both the P and P/l for oxygen decreases as the irradiation time increases. Selectivity, however, was shown to increase with a corresponding increase in treatment time.

EXAMPLE 7

Irradiation of Polyimide Blends

A series of membranes prepared from a blend of 90 weight percent di-t-bu PPDA polyimide (Example 2) and 10 weight percent TDA-CP polyimide (Example 3) were also prepared. The resultant membranes were treated with U.V. irradiation for varying lengths of time. The treated membranes, along with a control (untreated) membrane, were tested for oxygen and nitrogen permeability and selectivity. U.V. treatment times and the results are set out in Table 4. The measured values for oxygen and nitrogen permeability were used to calculate the composite P/l values using the series resistance model. Runs 14 through 16 demonstrate that both the P and P/l for oxygen decreases as the irradiation time increases. Selectivity, however, increased with a corresponding increase in treatment time.

EXAMPLE 8

Irradiation of Polyimide Blends

Finally, a series of membranes were prepared from a blend of 90 weight percent DDA polyimide (Example 1) and 10 weight percent TDA-CP polyimide (Example 3) were also prepared. The resultant membranes were treated with U.V. irradiation for varying lengths of time. The treated membranes, along with a control (untreated) membrane, were tested for oxygen and nitrogen permeability and selectivity. U.V. treatment times and the results are set out in Table 5. The measured values for oxygen and nitrogen permeability were used to calculate the composite P/l values using the series resistance model. Runs 17 and 18 demonstrate that both the P and P/l for oxygen decreases as the irradiation time increases. Selectivity, however, increased with a corresponding increase in treatment time.

TABLE 3
Blends of DDA Polyimide (.90) (Example 1) and TDA-CP Polyimide (.10) (Example 3)

| Run | Membrane Thickness (cm × $10^{-4}$) | UV Time (min.) | $\overline{P}(N_2)$ (Barrers) | $\overline{P/l}(N_2)$ Barrers/cm × $10^{-5}$ | $\overline{P}(O_2)$ (Barrers) | $\overline{P/l}(O_2)$ Barrers/cm × $10^{-5}$ | $\alpha(O_2/N_2)$ (based on $\overline{P}$) | $\alpha(O_2/N_2)$ (based upon cal'd P/l) |
| --- | --- | --- | --- | --- | --- | --- | --- | --- |
| 9 | 106 | 0 | 52.6 | — | 184.9 | — | 3.52 | — |
| 10 | 117 | 12.5 | 14.9 | 0.0178 | 85.7 | 0.136 | 5.75 | 7.64 |
| 11 | 174 | 15 | 10.6 | 0.0076 | 64.0 | 0.056 | 6.04 | 7.37 |
| 12 | 155 | 30 | 5.5 | 0.0040 | 43.2 | 0.036 | 7.85 | 9.00 |
| 13 | 153 | 60 | 3.3 | 0.0023 | 27.3 | 0.0021 | 8.27 | 9.13 | and selectivity. U.V. treatment times and the results are set out in Table 3. The measured values for oxygen and

TABLE 4
Blends of di-t-bu PPDA Polyimide (.90) (Example 2) and TDA-CP Polyimide (.10) (Example 3)

| Run | Membrane Thickness (cm × $10^{-4}$) | UV Time (min.) | $\overline{P}(N_2)$ (Barrers) | $\overline{P/l}(N_2)$ Barrers/cm × $10^{-5}$ | $\overline{P}(O_2)$ (Barrers) | $\overline{P/l}(O_2)$ Barrers/cm × $10^{-5}$ | $\alpha(O_2/N_2)$ (based on $\overline{P}$) | $\alpha(O_2/N_2)$ (based upon cal'd P/l) |
| --- | --- | --- | --- | --- | --- | --- | --- | --- |
| 14 | 115 | 0 | 34.0 | — | 123.2 | — | 3.63 | — |
| 15 | 109 | 30 | 13.9 | 0.0216 | 82.1 | 0.225 | 5.97 | 10.4 |
| 16 | 112 | 45 | 7.2 | 0.0082 | 50.5 | 0.0756 | 6.98 | 9.20 |

TABLE 5

| | Blends of DDA Polyimide (.90) (Example 1) and TDA-CP Polyimide (.10) (Example 3) | | | | | | | |
| --- | --- | --- | --- | --- | --- | --- | --- | --- |
| Run | Membrane Thickness (cm × $10^{-4}$) | UV Time (min.) | $\overline{P}(N_2)$ (Barrers) | $\overline{P/l}(N_2)$ Barrers/cm × $10^{-5}$ | $\overline{P}(O_2)$ (Barrers) | $\overline{P/l}(O_2)$ Barrers/cm × $10^{-5}$ | $\alpha(O_2/N_2)$ (based on $\overline{P}$) | $\alpha(O_2/N_2)$ (based upon cal'd $\overline{P/l}$) |
| 17 | 120 | 0 | 55.5 | — | 179.1 | — | .3.23 | — |
| 18 | 132 | 15 | 14.9 | 0.0154 | 94.5 | 0.152 | 6.34 | 9.8 |

The results presented in Tables 3 through 5 demonstrate that the irradiation of membranes prepared utilizing the polyimide blends according to the present invention provide enhanced selectivity without causing a large decrease in composite permeance. These materials are especially useful in commercial, non-cryogenic gas separation processes.

Having thus described the present invention, what is now deemed appropriate for Letters Patent is set out in the following appended claims.

What is claimed is:

1. A semi-permeable membrane formed of a composition of matter consisting essentially of a polyimide blend comprising from 10 to 25 weight percent of a first polyimide homopolymer represented by the formula:

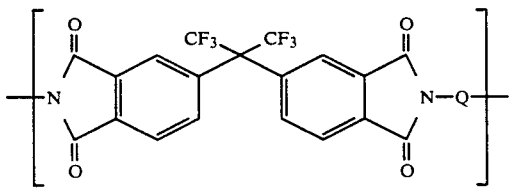

wherein Q is an alkenylated phenylene or diphenylene containing an allyl or allylaryl group;
and from 75 to 90 weight percent of a second polyimide homopolymer represented by the formula:

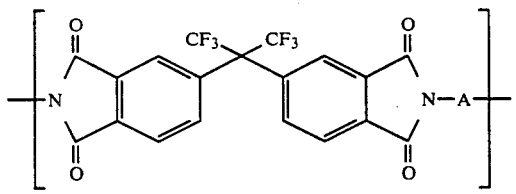

wherein A is an aromatic moiety.

2. The semi-permeable membrane of claim 1 formed of the polyimide blend which membrane contains surface modifiable functionalities.

3. The semi-permeable membrane according to claim 2 wherein the membrane having surface modifiable functionalities is contacted with a source of high energy electromagnetic irradiation to effect surface modification.

4. The semi-permeable membrane according to claim 3 wherein the source of high energy electromagnetic irradiation is selected from the group consisting of longwave UV irradiation, shortwave UV irradiation and X-ray irradiation, each with and without photo sensitizers.

5. The semi-permeable membrane according to claim 2 which has been contacted with a free radical source.

6. The semi-permeable membrane according to claim 5 which has been contacted with a free radical source selected from the group consisting of volatile peresters, peroxides and azo compounds followed by thermal activation with or without metal accelerators.

7. The semi-permeable membrane according to claim 1 wherein Q is an alkenylated phenylene having the general structural formula:

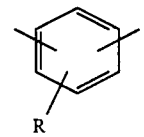

wherein each R is independently an allyl or allylaryl group.

8. The semi-permeable membrane according to claim 7 wherein R is an allyl group having the general formula:

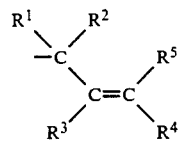

wherein $R^1$, $R^2$, $R^3$, $R^4$, and $R^5$ are independently selected from a hydrogen atom, a $C_1$-$C_3$ aliphatic, phenyl, halogen or alkoxy radical or $R^2$ and $R^4$ or $R^5$ are bridged via an alkylene radical —$(CH_2)_y$— wherein y is an integer ranging from 2 to 5, inclusive.

9. The semi-permeable membrane according to claim 7 wherein R is an allylaryl group having the general structural formula:

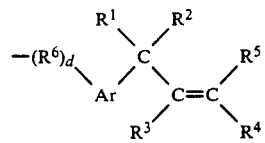

wherein $R^6$ is —$CH_2$—, Ar is phenylene or substituted phenylene, d=0 or 1 and $R^1$, $R^2$, $R^3$, $R^4$ and $R^5$ are hydrogen, $C_1$-$C_3$ aliphatic, phenyl, halogen or alkoxy radicals or $R^2$ and $R^4$ or $R^5$ are bridged via an alkylene radical —$(CH_2)_y$— wherein y=2 to 5.

10. The semi-permeable membrane according to claim 1 wherein Q is an alkenylated diphenylene having the general structural formula:

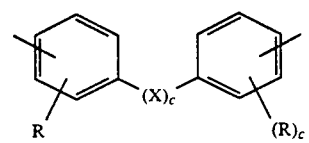

wherein each R is independently an allyl or allylaryl group; X is methylene, alkylene or $C_1$-$C_6$ branched alkylene group, oxygen, sulfur, sulfonyl, carbonyl, or fluoroalkylene and each c is independently 0 or 1.

11. The semi-permeable membrane according to claim 10 wherein each R is an allyl group.

12. The semi-permeable membrane according to claim 10 wherein each R is an allylaryl group.

13. The semi-permeable membrane according to claim 1 wherein Q has the structural formula:

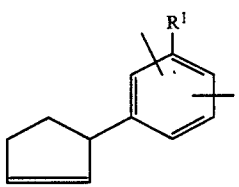

wherein $R^1$ is H or $CH_3$.

14. The semi-permeable membrane according to claim 1 wherein Q has the structural formula:

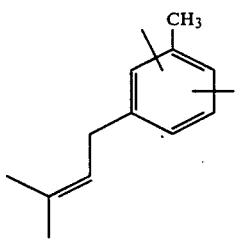

15. The semi-permeable membrane according to claim 1 wherein said polyimide also contains a third polymerizable unit of the formula:

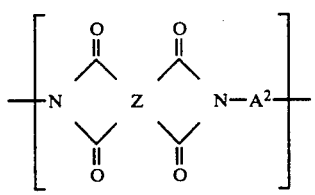

wherein $A^2$ is an aromatic moiety;
and Z is

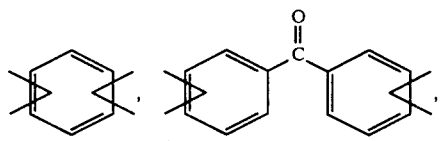

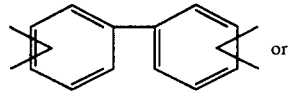

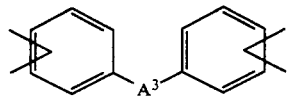

wherein $A^3$ is $C(CH_3)_2$, O S or $SO_2$.

16. A process for separating a gas mixture containing two or more components, said process comprising: bringing said gas mixture into contact with one side of a permselective membrane which is formed from the polyimide blend of claim 1 whereby one component selectively permeates through the membrane at a different productivity rate than at least one other component.

17. The process according to claim 16 wherein the gas mixture comprises nitrogen and oxygen.

18. A process for separating a gas mixture containing two or more components, said process comprising: bringing said gas mixture into contact with one side of a permselective membrane which is formed from the polyimide blend of claim 2 whereby one component selectively permeates through the membrane at a different productivity rate than at least one other component.

19. The process according to claim 18 wherein the gas mixture comprises nitrogen and oxygen.

20. A process for separating a gas mixture containing two or more components, said process comprising: bringing said gas mixture into contact with one side of a permselective membrane which is formed from the polyimide blend of claim 3 whereby one component selectively permeates through the membrane at a different productivity rate than at least one other component.

21. The process according to claim 20 wherein the gas mixture comprises nitrogen and oxygen.

22. A process for separating a gas mixture containing two or more components, said process comprising: bringing said gas mixture into contact with one side of a permselective membrane which is formed from the polyimide blend of claim 5 whereby one component selectively permeates through the membrane at a different productivity rate than at least one other component.

23. The process according to claim 22 wherein the gas mixture comprises nitrogen and oxygen.

* * * * *

UNITED STATES PATENT AND TRADEMARK OFFICE
CERTIFICATE OF CORRECTION

PATENT NO. : 5,061,298

DATED : October 29, 1991

INVENTOR(S) : Burgoyne, Jr et al.

It is certified that error appears in the above-identified patent and that said Letters Patent is hereby corrected as shown below:

Column 5, line 50, after "and" insert -- Z is --.

Column 7, line 53, delete "}" insert -- ) --.

Signed and Sealed this

Twenty-third Day of February, 1993

Attest:

STEPHEN G. KUNIN

*Attesting Officer*       *Acting Commissioner of Patents and Trademarks*